United States Patent
Bshara et al.

(10) Patent No.: US 10,951,537 B1
(45) Date of Patent: Mar. 16, 2021

(54) ADJUSTABLE RECEIVE QUEUE FOR PROCESSING PACKETS IN A NETWORK DEVICE

(71) Applicant: Amazon Technologies, Inc., Seattle, WA (US)

(72) Inventors: Said Bshara, Tira (IL); Clint Joseph Sbisa, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/143,217

(22) Filed: Sep. 26, 2018

(51) Int. Cl.
*H04L 12/70* (2013.01)
*H04L 12/863* (2013.01)
*H04L 12/835* (2013.01)

(52) U.S. Cl.
CPC .............. *H04L 47/50* (2013.01); *H04L 47/30* (2013.01)

(58) Field of Classification Search
None
See application file for complete search history.

(56) References Cited

U.S. PATENT DOCUMENTS

| | | | | |
|---|---|---|---|---|
| 7,802,071 B2* | 9/2010 | Oved | ...................... | G06F 13/28 |
| | | | | 711/170 |
| 9,569,291 B1* | 2/2017 | Karppanen | .............. | G06F 9/544 |
| 10,448,266 B2* | 10/2019 | Sell | ........................ | H04W 72/08 |
| 10,452,301 B1* | 10/2019 | Farhan | .................. | G06F 3/0647 |

* cited by examiner

Primary Examiner — Willie J Daniel, Jr.
(74) Attorney, Agent, or Firm — Klarquist Sparkman, LLP

(57) ABSTRACT

A network device, such as a Network Interface Card (NIC), can have a receive queue (RxQ) that changes size based on whether the network device is in a normal operating mode or in a maintenance mode. In a normal operating mode, it is desirable that the receive queue has a smaller number of free buffers, to increase cache locality in a processor subsystem. However, there can be known periods when the receive queue can be overloaded. During a maintenance period, it is desirable that the receive queue absorbs a large burst of network packets while the processor subsystem is not processing the packets. A solution is to maintain a receive queue at a smaller percentage of its maximum during the normal operation mode, but then before or upon entering the maintenance mode, expand the receive queue to a larger size.

13 Claims, 6 Drawing Sheets

ADJUSTABLE RECEIVE QUEUE FOR PROCESSING PACKETS IN A NETWORK DEVICE

BACKGROUND

Cloud computing is the use of computing resources (hardware and software) which are available in a remote location and accessible over a network, such as the Internet. Users are able to consume these computing resources (including storage and computing power). Use of virtual computing resources can provide a number of advantages including cost advantages and/or ability to adapt rapidly to changing computing resource needs.

The cloud computing environment can include a plurality of host server computers coupled together through a network. To send and receive packets over the network, the host server computers can include one or more Network Interface Cards (NIC), also known as a network adapter or a physical network interface. The NIC can be a peripheral component (e.g., plug-in board) coupled to a host server computer, or can be built into a motherboard of the host server computer. The NIC can include one or more queues for transmitting and receiving packets. A common reason for frame loss to occur is a queue overrun. Generally, a queue size is fixed, and if the queue fills faster than it drains, frames can be dropped, leading to errors. The queue size can be adjusted to make it larger, but larger queues can be less efficient and consume resources if not generally needed.

DETAILED DESCRIPTION

A receive queue (RxQ) in a network device can have one or more free buffers associated with each queue entry. Incoming network packets are stored in these free buffers, processed and then the buffers get recycled. In a normal operational mode, it is desirable that the receive queue has a smaller number of free buffers, to increase cache locality in a processor subsystem that is handling processing of these packets. However, there can be known periods when the receive queue can be overloaded. One such period is called a "maintenance" period, where the processor subsystem performs other tasks that slow or prevent the processing of packets in the receive queue. During the maintenance period, it is desirable that the receive queue absorbs a large burst of network packets while the processor subsystem is not processing them or is processing them at a slower rate than a normal operational mode. Previous solutions resulted in engineers setting the receive queue to the maximum size, which compromises system efficiency. A solution is to maintain a receive queue at a smaller percentage of its maximum size during the normal operation mode, but then before or upon entering the maintenance mode, expand the receive queue to a larger size, such as its maximum size. Once the maintenance period has ended, the receive queue can return to its previous size for the normal operational mode. The changing size of a receive queue in a network device to account for maintenance has the benefit of allowing a smaller size ring buffer during normal operation, which improves efficiency, and allowing a larger size ring buffer when packets could otherwise be dropped.

Figure 1:
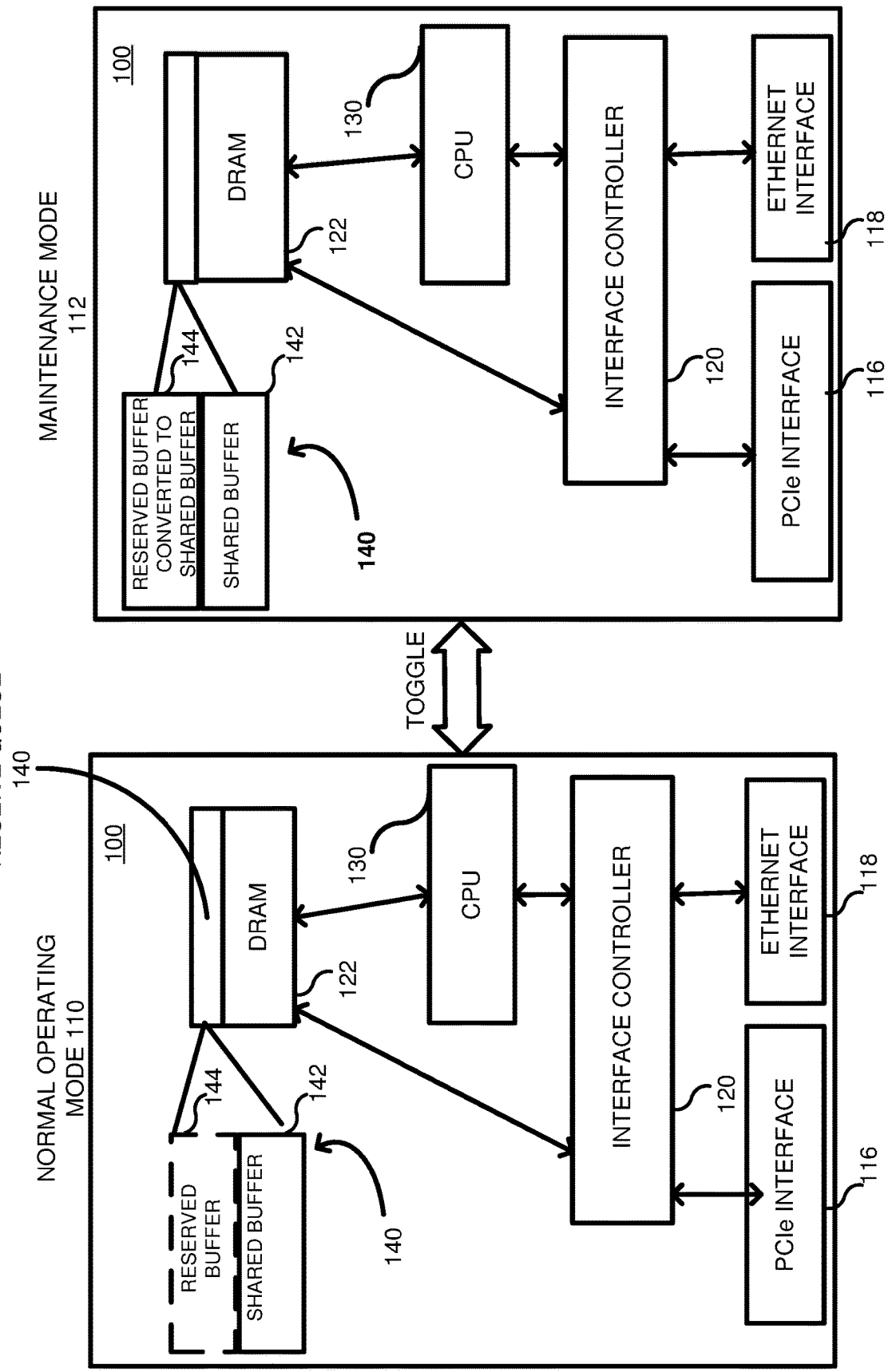
FIG. 1 is a system diagram showing a network device switching between a normal operating mode and a maintenance mode.

FIG. 1 illustrates a server computer 100 (alternatively, 100 can be a card within a server computer, such as a NIC) that can be toggled between a normal operating mode 110 and a maintenance mode 112. Although the same server computer 100 is shown on both the right and left side of FIG. 1, the components that are accessible differs between the modes 110, 112. The server computer 100 includes multiple interfaces including a PCIe interface 116 and an Ethernet interface 118. Although the PCIe interface 116 and the Ethernet interface 118 are shown, other interfaces can be used. The PCIe interface 116 is generally a bus interface that allows communication with other components within the server computer 100. The Ethernet interface 118 is generally a network interface to allow communications external to the server computer 100, such as communications over the Internet. Both the PCIe interface 116 and the Ethernet interface 118 can be coupled to an interface controller 120, which can be a single Integrated Circuit (IC) or multiple ICs. The interface controller 120 uses an appropriate protocol for receiving and transmitting messages over the interfaces 116, 118. Packets received on the interfaces can be stored in a memory, shown in this example as a Dynamic Random Access Memory (DRAM) 122, but other memory types can be used, such as Flash memory or other forms of RAM. The server computer 100 can further include a controller (shown as a Central Processing Unit (CPU)) and other associated hardware and software, shown generally at 130. The CPU is also coupled to the DRAM 122 and can process packets received in the DRAM from the interface controller. In some embodiments, the CPU 130 and the interface controller 120 can be in a single IC. The CPU 130 can further transmit packets by placing packets in the DRAM 122. Thus, the DRAM is a dual-port memory that is shared between the CPU 130 and the interface controller 120 and allows communication there between. More specifically, the DRAM operates as a receive queue for receiving incoming packets.

In this embodiment, the receive queue is shown at 140 and includes a shared buffer area 142 and a reserved buffer area 144. The shared buffer area 142 is always available as part of the receive queue. However, the reserved buffer area 144 is not available during the normal operating mode 110, as indicated by the dashed lines. When the server computer 100 switches to the maintenance mode 112, the reserved buffer area 144 is added to the receive queue 140 and becomes shared, as indicated by the reserved buffer area being shown in solid lines. Consequently, the receive queue 140 dynamically changes size when the server computer 100 switches from a normal operating mode 110 to a maintenance mode 112 of operation. During the maintenance mode, the CPU 130 has an increased workload and processing packets in the receive queue 140 might be reduced. Consequently, the increased buffer size of the maintenance mode ensures that packets are not dropped due to the receive queue overflowing. Although shown as increasing a size of a memory area 140, the memory area 140 can be fixed and a usable area for the receive queue can vary based on the mode. For example, the receive queue can expand from 10% of the total memory area 140 to 100%. In one embodiment, a start-of-valid-data pointer to an end-of-valid-data pointer can have a first maximum in the normal operating mode and a second maximum value, larger than the first maximum value, in the maintenance mode. Additionally, although the buffer area is shown as increasing from a first to a second size, it can be increased gradually until it reaches the second size.

The maintenance mode can be entered after the CPU 130 receives a message indicating that the maintenance mode will be initiated. Such a message is generally received over the PCIe interface 116. The CPU 130 then changes its' receive queue parameters to include the reserved buffer area 144, and notifies the interface controller 120 that the reserved buffer area is now available. The interface controller 120 can update its' receive queue parameters to include the reserved buffer area 144 so that network traffic from either interface 116, 118 can be stored in the shared buffer 142 and the reserved buffer 144, as a combined receive queue. Once the maintenance mode 112 is completed, the CPU 130 can notify the interface controller 120 that the server computer 100 is toggling back to a normal operating mode 110. In such a case, the receive queue size is reduced back to only the shared area 142. When toggling back to the normal operating mode, any residual packets remaining in the reserved buffer 144 can be processed so as not to drop packets. However, any new packets received are stored only in the shared buffer area 142. Thus, there can be a clean-up period wherein new packets have a different size for a receive queue than older packets.

As indicated, the dynamically expandable receive queue 140 can be available storage in only a portion of DRAM 122. Other portions of the DRAM can be used for other purposes, such as general data storage for the CPU 130. In one example operation, the CPU 130 can process a network packet, store it in the queue 140 and the interface controller 120 can read the packet from the queue 140 for transmission over one of the interfaces 116, 118.

Communications from the Ethernet interface 118 can be in the form of network service requests generated by the service provider. Network services are commonly used in cloud computing. A network service is a software function provided at a network address over the web or the cloud. Clients initiate network service requests to servers and servers process the requests and return appropriate responses. The client network service requests are typically initiated using, for example, an Application Programming Interface (API) request. For purposes of simplicity, network service requests will be generally described below as API requests, but it is understood that other network service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a network service receives the API request from a client device or from the host computer, the network service can generate a response to the request and send the response to the endpoint identified in the request.

Through an API to the server computer 100, the service provider can switch modes of the server 100 between the normal operating mode and the maintenance mode. Alternatively, an internal request within the server computer 100 can pass over the PCIe interface to the CPU 130 directing the CPU to switch modes from normal operating mode to maintenance mode or vice versa. In one example, the CPU 130 is on a NIC and the message to switch modes is from a motherboard of the server computer to the NIC. In still further embodiments, the interface controller 120 can receive the request to switch the mode and the interface controller can inform the CPU 130 of the switch to the maintenance mode 112 or back to the normal operating mode 110.

Figure 2:
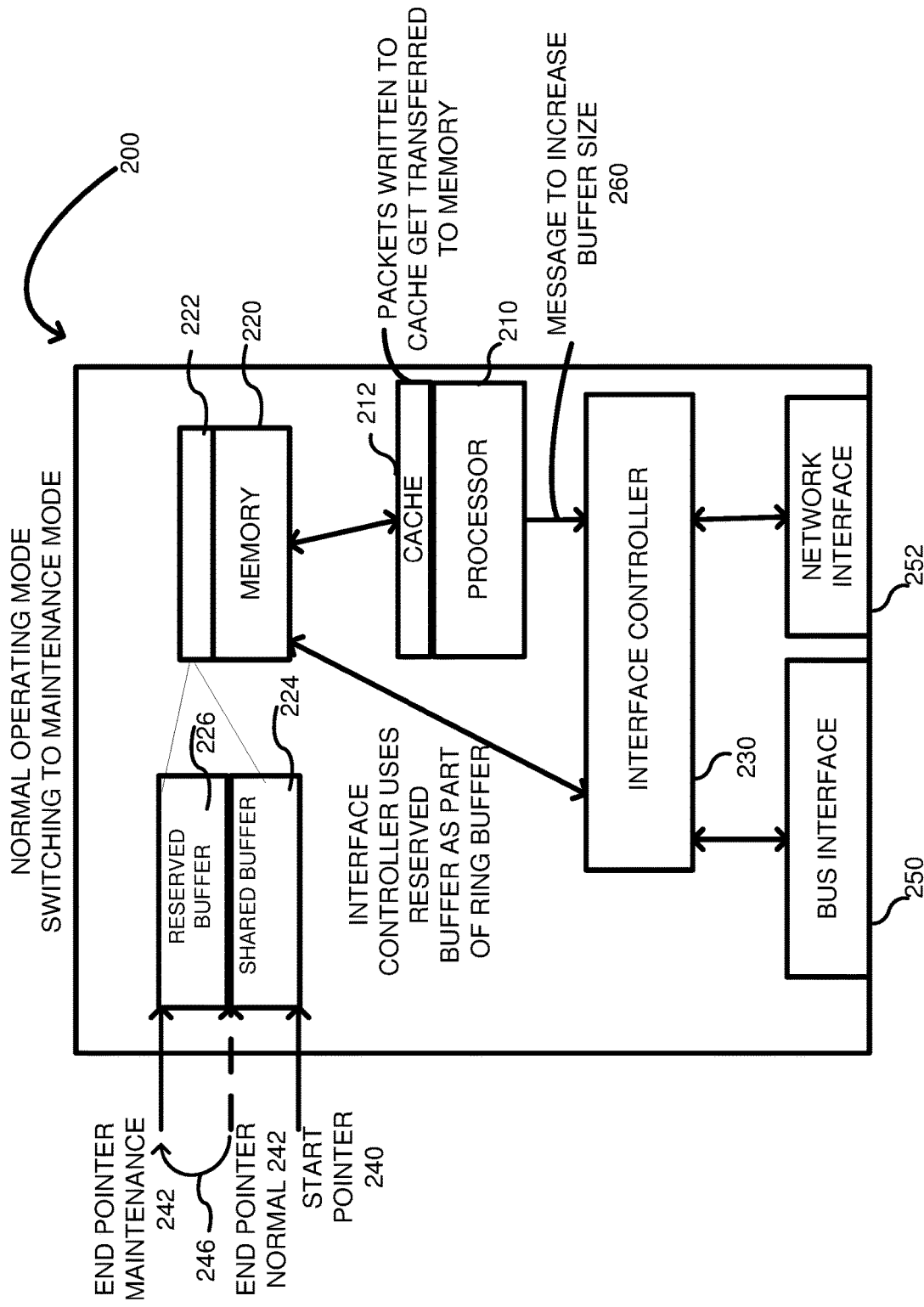
FIG. 2 shows an embodiment of the network device wherein a CPU within the network device includes a cache.

FIG. 2 is an example of another embodiment of a network device 200, which can be part of a motherboard on a host server computer, or otherwise plugged into a host server computer. In this embodiment, a processor 210 includes a cache 212. The processor 210 can write data, such as a network packet, to an entry in the cache 212 and the cache entry is automatically copied to the memory 220, which can be a DRAM or other type of RAM. A portion 222 of the memory 220 includes a shared buffer portion 224 and a reserved buffer portion 226. The shared buffer portion 224 can be available for a receive queue during normal operation and accessible to both the processor and an interface controller 230. In this embodiment, the interface controller is coupled to a bus interface 250, such as a PCIe interface or other standard bus interfaces, and coupled to a network interface 252, such as an Ethernet interface or other standard network interfaces. Also, during normal operating mode, the reserved buffer is not part of the receive queue, and is generally not used and kept in reserve in the memory 220. A maintenance mode can be entered when the processor 210 receives a message through either interface 250, 252 that the maintenance mode is to begin. In response, the processor 210 can send a message 260 to the interface controller 230 that the mode is switching to the maintenance mode. When switching to the maintenance mode, the reserved buffer 226 is added to the receive queue so that the receive queue is temporarily expanded during the maintenance mode. The expanded receive queue can be in the form of a ring buffer or circular buffer. Thus, pointers associated with the ring buffer can be changed during the maintenance mode. In particular, a pointer 240 to the start of memory can remain unchanged because it points to the beginning of the shared memory 224. However, a pointer 242 to an end of the memory is changed from the end of the shared buffer 224 to an end of the reserved buffer 226, as indicated by arrow 246. Pointers associated with a start of valid data (not shown) and an end of valid data (not shown) can also extend into the reserved buffer, whereas in the normal operating mode, such pointers cannot extend into the reserved buffer.

When switching back to the normal operating mode, the end pointer 242 is switched back to the end of the shared buffer area 224. The start pointer 240 can remain unchanged. However, the start of valid data pointer and end of valid data pointer are allowed to remain in the reserved buffer area 226 for a transition period until entries in the reserved area are processed. New packets can be stored in the shared buffer area 224 during the transition period.

Figure 3:
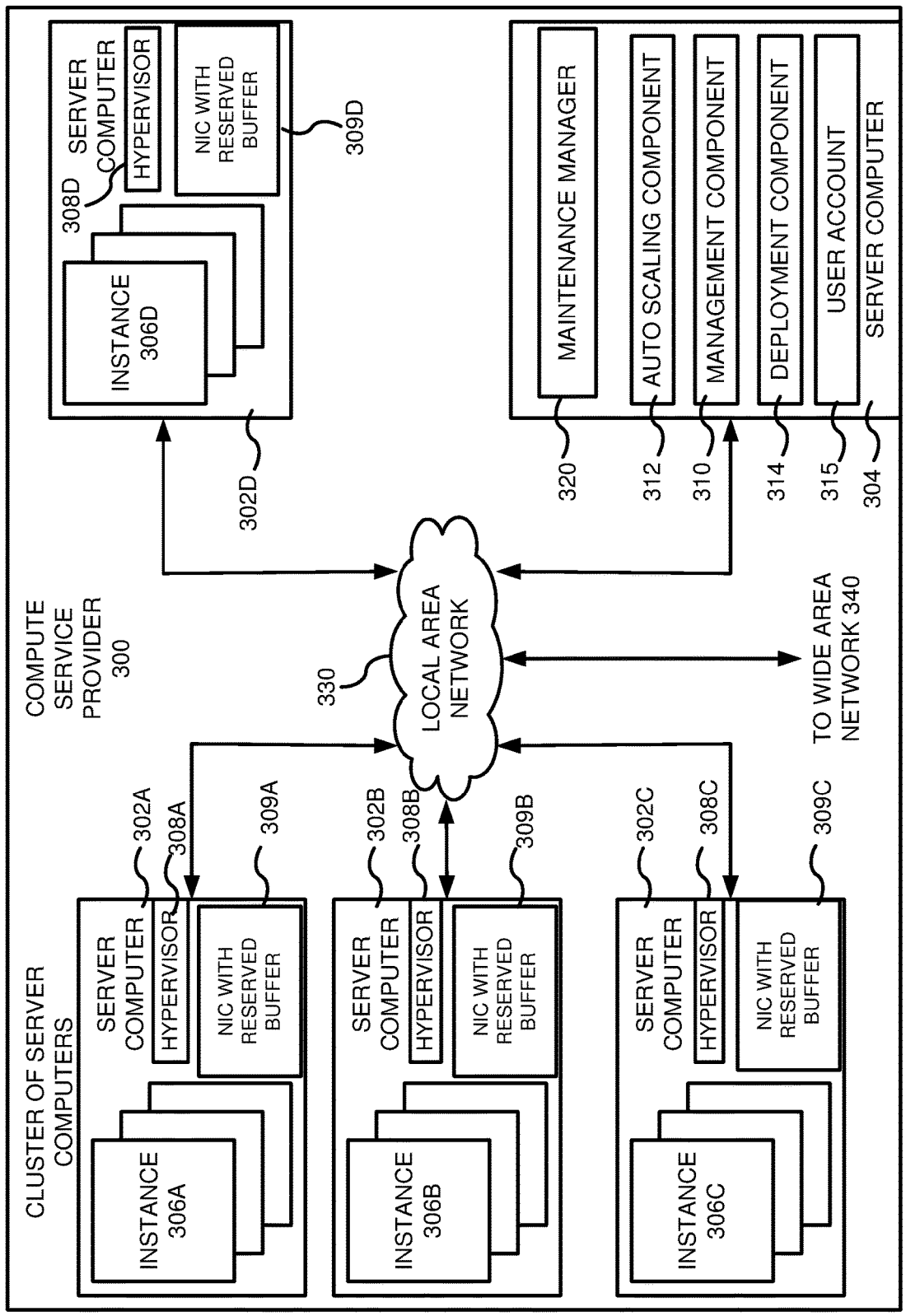
FIG. 3 is an example system diagram showing a plurality of virtual machine instances running in the multi-tenant environment with the network device plugged into server computers within the system.

FIG. 3 is a computing system diagram of a network-based compute service provider 300 that illustrates one environment in which embodiments described herein can be used.

By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of users operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308A-308D or another type of program configured to enable the execution of multiple instances 306 on a single server. Additionally, each of the instances 306 can be configured to execute one or more applications. The server computers 302A-D can further include hardware, software, firmware or combinations thereof (e.g., one or more cards having processors executing software) 309A-309D that can be toggled between a normal operating mode and a maintenance mode. Additionally, the instance 306 can communicate with the hardware/software/firmware 309 through a PCIe interface, such as PCIe interface 116 (FIG. 1).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. Thus, the compute service provider 300 can execute control plane functions through the one or more server computers 304. For example, the server computer 304 can execute a management component 310. A user can access the management component 310 to configure various aspects of the operation of the instances 306 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 312 can scale the instances 306 based upon rules defined by the user. In one embodiment, the auto scaling component 312 allows a user to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist users in the deployment of new instances 306 of computing resources. The deployment component can have access to account information associated with the instances, such as who is the owner of the account, credit card information, country of the owner, etc. The deployment component 314 can receive a configuration from a user that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the user-provided configuration and cache logic to configure, prime, and launch new instances 306. The configuration, cache logic, and other information may be specified by a user using the management component 310 or by providing this information directly to the deployment component 314. The instance manager can be considered part of the deployment component.

User account information 315 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

The server computer 304 can further include a maintenance manager 320 for managing the hardware/software/firmware 309A-309D. Returning briefly to the embodiment of FIG. 1, commands from the maintenance manager 320 within the control plane can be passed through the Ethernet interface 118 to the server computer 100. The commands can be in the form of APIs and can be received by the interface controller 120 or the CPU 130 for switching modes of operation between the normal operating mode and the maintenance mode. Alternatively, the server computers 302A-302D can individually control when to switch modes, such as through the PCIe interface 116. In still another embodiment, the network device can determine when to switch modes, such as by a time-based determination.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

Figure 4:
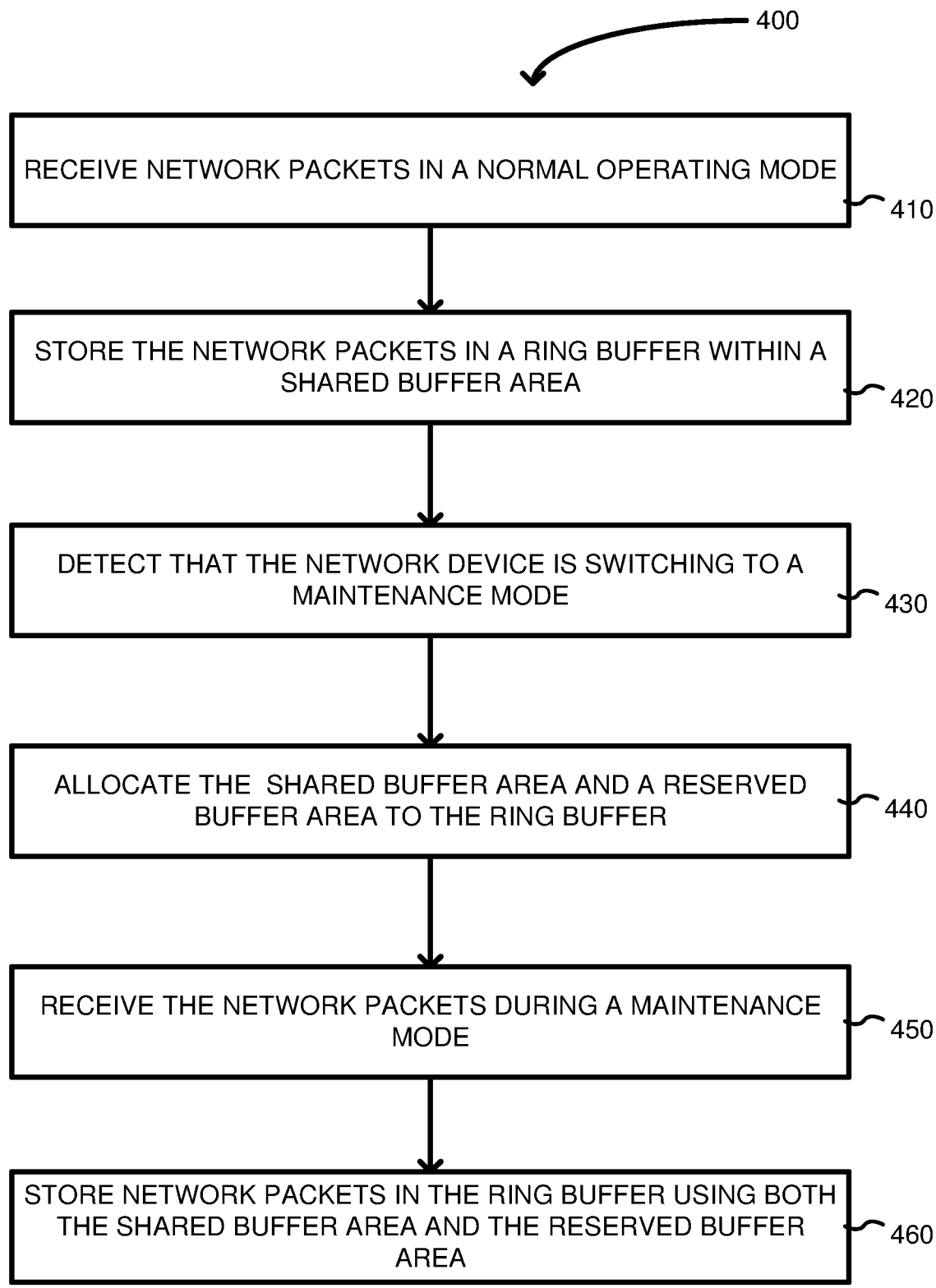
FIG. 4 is a flowchart according to one embodiment for switching between a normal operating mode and a maintenance mode.

FIG. 4 is a flowchart 400 of a method for processing network packets in a network device. In process block 410, network packets are received in a normal operating mode. For example, FIG. 1 shows network packets can be received from any of a plurality of interfaces, such as the PCIe interface 116 and/or the Ethernet interface 118. The packets can also represent user network traffic in a compute service provider environment, such as is shown at 300 in FIG. 3. In process block 420, the network packets can be stored within a ring buffer of a shared buffer area. For example, in FIG. 2, the network packets can be stored in the memory 220 that is accessible (i.e., writable and/or readable) from both the processor 210 and the interface controller 230. The shared buffer area 222 can be a ring buffer and can initially include only the shared buffer area 224 while in a normal mode of operation. In process block 430, a detection is made that the network device is switching to a maintenance mode from the normal operating mode. For example, turning to FIG. 3, the maintenance manager 320 can signal to one or more server computers 302A-302D that a maintenance mode should be initiated. Turning to FIG. 1, such a signal can be in the form of an API received over either the PCIe interface 116 or the Ethernet interface 118. The detection can be made by either the interface controller 120 or the CPU 130 or both. Based on the design, either the interface controller 120 or the controller 130 can be a master in a master/slave relationship is terms of signaling that the mode is being toggled. In process block 440, memory allocation is changed such that the ring buffer can use a larger size that includes the shared buffer area and a reserved buffer area. For example, responsive to the detection in process block 430, in FIG. 2, both the processor 210 and the interface controller 230 can extend the buffer area 222 to include both the shared buffer 224 and the reserved buffer 226. In one implementation, the end pointer 242 is modified to point to a last entry within the reserved buffer 226, as opposed to the last entry in the shared buffer 224. In another embodiment, memory allocated for use by the ring buffer is increased from a smaller percentage to 100%. In process block 450, network packets are received during the maintenance period. For example, in FIG. 2 packets can be received over either the bus interface 250 or the network interface 252. Alternatively, packets can be received in the memory 220 from the processor 210 as packets that have been processed. In process block 560, the network packets are stored in the ring buffer using both the shared buffer area and the reserved buffer area. Thus, in FIG. 2, the processor 210 and the interface controller 230 can use the combined buffer area 224, 226 to store packets.

Figure 5:
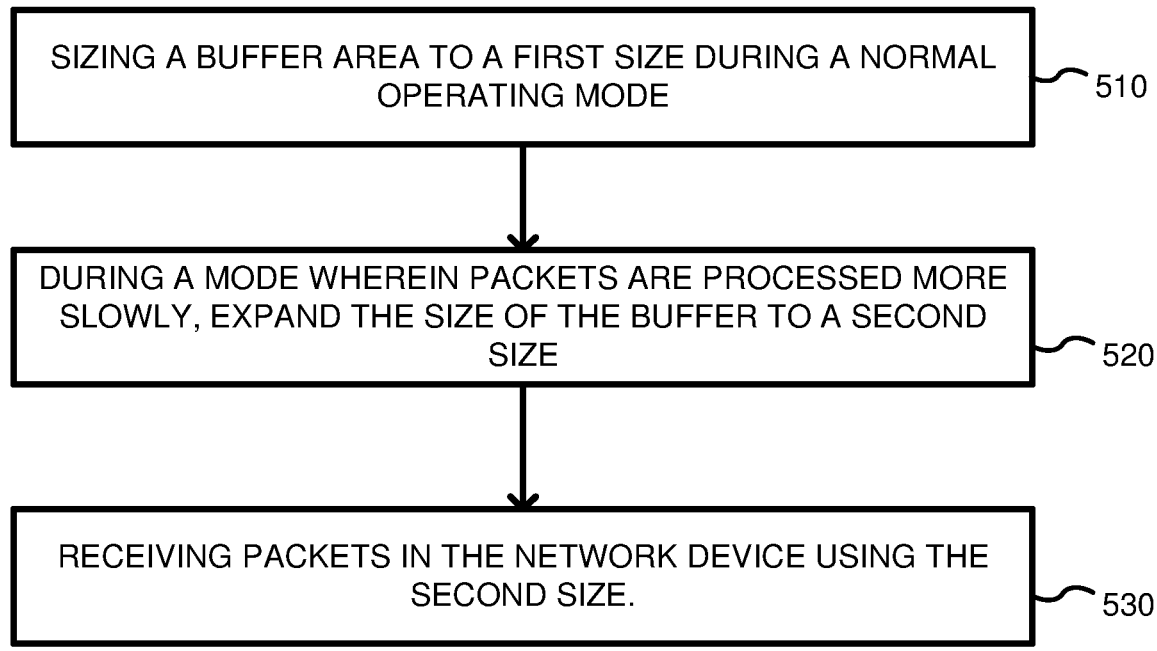
FIG. 5 is a flowchart according to another embodiment for switching between a normal operating mode and a maintenance mode.

FIG. 5 is a flowchart according to another embodiment for processing packets in a network device. In process block 510, a size of a buffer area is a first size during a normal operating mode. For example, the left side of FIG. 1 shows the normal operating mode 110 and the shared buffer area is limited to the buffer area 142. During this time, the CPU 130 and the interface controller 120 use the shared buffer area 142 and do not use the reserved buffer 144 for storing packets. In process block 520, during a mode wherein packets are processed more slowly, a size of the buffer can be expanded. For example, during a maintenance mode of operation, the size of the buffer is expanded to a second size, which is larger than the first size. Thus, turning again to FIG. 1, in the maintenance mode 112, the shared buffer area 140 includes both the reserved buffer 144 and the original shared buffer 142. Notably, the shared buffer area 142 is available in both modes of operation, while the reserved buffer area 144 is only available during the maintenance mode of operation. In process block 530, the packets in the network device are received and stored in the buffer area using the second, larger size. In this way, the probability of lost packets due to overflow of the buffer area during the maintenance period is reduced. After the maintenance period ends, the buffer area can be reduced back to the first size. A transition period of time can be needed to clear out packets stored in the reserved buffer area.

Figure 6:
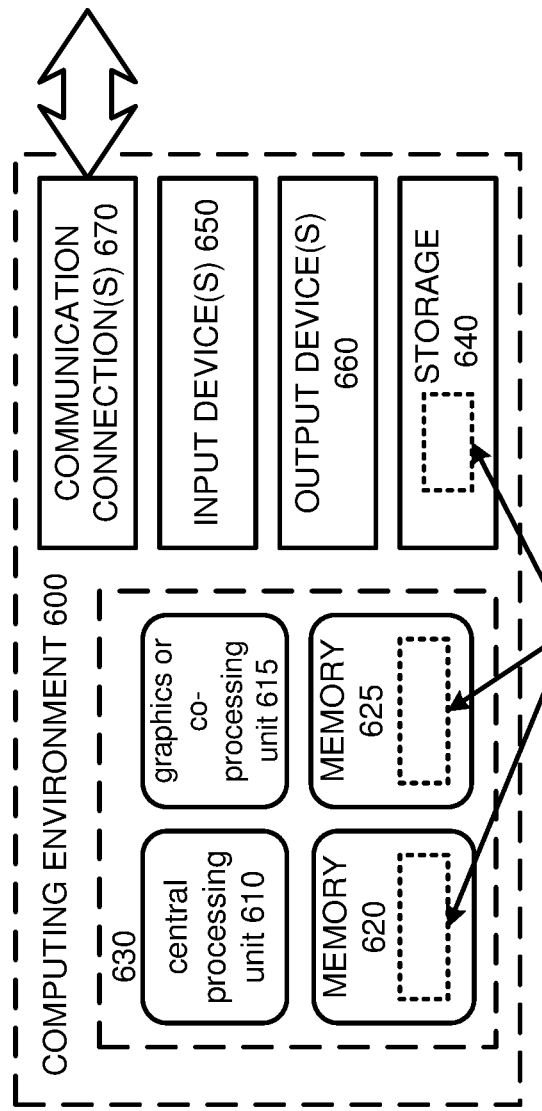
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method, comprising:

sizing a buffer for receiving packets in a network device to a first size during a first operating mode of the network device, wherein the network device receives the packets from at least two separate interfaces including a bus interface and a network interface and the buffer is a shared buffer area for exchanging packets between the two interfaces;

during a second operating mode of the network device, wherein packets are processed by the network device more slowly than in the first operating mode, expanding the buffer to a second size, larger than the first size using a previously reserved area of a memory so that the buffer includes the shared buffer area and the reserved area of the memory;

informing an interface controller in the network device of the second size of the buffer;

receiving packets in the network device and storing the packets in the buffer using the second size during the second operating mode;

detecting that the second operating mode has been completed, and switching from the second operating mode to the first operating mode; and using only the shared buffer area for received packets after the switching to the first operating mode but maintaining pointers for valid data in the reserved area during a transition period when switching from the second operating mode to the first operating mode.

2. The method of claim 1, wherein the second operating mode is a maintenance mode and wherein the buffer is a ring buffer having a shared buffer area and the reserved buffer area, and wherein during the first operating mode, only a portion of the ring buffer is used as a receive queue, and during the maintenance mode, a total of the ring buffer including both the shared buffer area and the reserved buffer area are used as the receive queue.

3. The method of claim 1, wherein the network device is a Network Interface Card (NIC) coupled to a host server computer, wherein the NIC includes a processor and the interface controller that share the buffer to transfer packets.

4. The method of claim 1, wherein the bus interface is a PCIe interface through which users of the host server computer access the NIC.

5. The method of claim 3, wherein the processor receives a message from the host server computer that the second operating mode is to begin, and wherein the processor communicates to the interface controller to enter the second operating mode.

6. The method of claim 3, wherein the processor includes a cache, and wherein the processor writes packets to cache, wherein the written packets are copied to the buffer.

7. The method of claim 1, wherein the buffer is a ring buffer that is a portion of the memory on the network device.

8. An apparatus, comprising:
a processor coupled to a bus interface;
an interface controller coupled to a network interface and to a bus interface; and
a memory including a shared buffer area for storing network packets received by the apparatus over the network interface, the shared buffer area being a first size in a first operating mode of the apparatus and a second size, larger than the first size, during a second operating mode of the apparatus, wherein the second size includes a reserved buffer area that is not available for use by the network interface in the first operating mode and wherein the processor informs the interface controller of a switching from the first to the second operating mode;
wherein the processor is configured to detect that the second operating mode has been completed, and to switch from the second operating mode to the first operating mode and wherein the processor is configured to maintain pointers for valid data in the reserved buffer area during a transition period when switching from the second operating mode to the first operating mode and to process packets from the reserved buffer while new packets are restricted from being stored in the reserved buffer.

9. The apparatus of claim 8, wherein the bus interface is a PCIe interface and wherein the network interface is an Ethernet interface.

10. The apparatus of claim 8, wherein the apparatus is a Network Interface Card (NIC) plugged into a host server computer.

11. The apparatus of claim 8, wherein the memory is a Dynamic Random Access Memory (DRAM) that is coupled to both the processor and the interface controller.

12. The apparatus of claim 8, wherein the processor is configured to transmit a message to the interface controller signaling that the second operating mode is to be used.

13. The apparatus of claim 8, wherein the shared buffer area is a ring buffer for storing received network packets.

\* \* \* \* \*